(12) United States Patent
Pau (10) Patent No.: US 6,754,508 B1
(45) Date of Patent: *Jun. 22, 2004

(54) MULTIPLE-BAND WIRELESS TRANSCEIVER WITH QUADRATURE CONVERSION TRANSMITTER AND RECEIVER CIRCUITS

(75) Inventor: Hak Ming Pau, Milpitas, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 09/769,877

(22) Filed: Jan. 25, 2001

(51) Int. Cl.$^7$ .............................................. H04M 01/00
(52) U.S. Cl. .................... 455/552.1; 455/255; 455/285; 455/553.1
(58) Field of Search .............................. 455/552.1, 102, 455/180.1, 76, 86, 285, 283, 280, 73, 118, 255, 553.1, 650.1

(56) References Cited

U.S. PATENT DOCUMENTS

| | | | |
|---|---|---|---|
| 4,097,816 A | | 6/1978 | Imazeki et al. |
| 4,450,583 A | * | 5/1984 | Strobel et al. ................ 455/86 |
| 4,627,099 A | * | 12/1986 | Shimakata .................... 455/76 |
| 5,732,330 A | | 3/1998 | Anderson et al. ............. 455/76 |
| 5,896,562 A | | 4/1999 | Heinonen .................... 455/76 |
| 5,926,751 A | * | 7/1999 | Vlahos et al. ............... 455/280 |
| 5,974,305 A | | 10/1999 | Matero .................... 455/188.1 |
| 5,983,081 A | | 11/1999 | Lehtinen ..................... 455/76 |
| 6,029,052 A | | 2/2000 | Isberg et al. ................ 455/131 |
| 6,175,746 B1 | * | 1/2001 | Nakayama et al. |
| 6,269,253 B1 | * | 7/2001 | Maegawa et al. ........ 455/552.1 |
| 6,484,013 B1 | * | 11/2002 | Ishii ........................... 455/73 |
| 6,609,010 B1 | * | 8/2003 | Dolle et al. ................. 370/208 |
| 2002/0049046 A1 | | 4/2002 | Audinot |

OTHER PUBLICATIONS

Behzad Razavi, "A 900–MHz/1.8–GHz CMOS Transmitter for Dual–Band Applications", IEEE Journal of Solid–State Circuits, vol. 34, No. 5, May 1999, pps. 573–579.

Stephen Wu and Behzad Razavi, "A 900–MHz/1.8–GHz CMOS Receiver for Dual–Band Applications", IEEE Journal of Solid–State Circuits, vol. 33, No. 12, Dec. 1998, pps. 2178–2185.

* cited by examiner

Primary Examiner—Sonny Trinh
(74) Attorney, Agent, or Firm—Vedder, Price, Kaufman & Kammholz, P.C.

(57) ABSTRACT

An architecture for a multiple-band wireless transceiver with quadrature conversion receiver and transmitter circuits. Dual dedicated local oscillators provide the necessary frequency up and down conversion signals for the transmitter and receiver circuits, respectively, thereby allowing for duplex transmit and receive operations. Each of the transmitter and receiver circuits include multiple, e.g., three, signal paths for providing multiple-band operation. In the transmitter, the outgoing baseband data is quadrature modulated. The modulated data signals are then frequency up converted using another quadrature signal mixing process which avoids any need for image signal rejection filters within the signal transmission path. Similarly, in the receiver, quadrature signal mixing is used for the frequency down conversion process, thereby avoiding any need for image signal rejection filters within the signal reception path. The down-converted data signals are then quadrature demodulated to produce the incoming baseband data.

15 Claims, 8 Drawing Sheets

MULTIPLE-BAND WIRELESS TRANSCEIVER WITH QUADRATURE CONVERSION TRANSMITTER AND RECEIVER CIRCUITS

BACKGROUND OF THE INVENTION

1. Field of the Invention

The present invention relates to wireless transceivers such as those used in cellular telephones, and in particular, to multiple-band wireless transceivers for use in multiple-band cellular telephones or radio telephones, or mobile stations capable of operation with a cellular network.

2. Description of the Related Art

Demand for multiple-band, e.g. triple-band, wireless transceivers for use in cellular telephones is increasing. Indeed, with multiple cellular telephone network standards in use throughout the world, such a telephone is necessary when travelling from one country to another. In the United States, there is presently at least one system which supports dual band operation, namely the 800 MHz digital TDMA (time division multiple access) and AMPS (advanced mobile phone service) and 1900 MHz digital TDMA, or 800 MHz CDMA (code division multiple access) and AMPS and 1900 MHz CDMA. In Europe, the dual band system supports 900 MHz GSM (global system for mobile wireless service) and 1800 MHz DCS1800 GSM.

Along with such dual band cellular telephones, there is increasing demand to add a short range radio transceiver capability such as Bluetooth or PAN (personal area network) in the already lightweight pocket cellular telephones now available. This type of short range radio transceiver service is located within the frequency spectrum of 2400–2500 MHz.

Meanwhile, a third generation mobile telecommunications system such as UMTS (universal mobile telecommunications system) is under development. Such systems, it is believed, will also likely require some form of triple-band operation capability, such as, for example, 900 MHz GSM, 1800 MHz DCS1800 and 2.2 GHz UMTS.

The principle challenge of providing multiple-band operation involves the increased costs and form factor requirements of the transceiver architecture needed to support this. For example, conventional approaches to increasing the number of bands of operation involve adding additional RF circuitry in the form of integrated circuits that provide the modulator, demodulator, frequency synthesizing and oscillator functions. In addition to these active components, additional passive components are also needed, such as SAW (surface acoustic wave) filters, resistors, capacitors and inductors, thereby also requiring additional space in the already space-limited handheld devices.

Accordingly, it would be desirable to provide for multiple-band wireless transmitter and receiver operation without significantly impacting the space and size requirements of existing cellular telephone system designs.

SUMMARY OF THE INVENTION

A multiple band wireless transceiver with quadrature conversion transmitter and receiver circuits in accordance with the present invention uses dual local oscillators for transmit and receive operations, thereby providing for frequency division duplex (FDD) operation in that signal transmission and reception can occur simultaneously at two different frequencies. The multiple transmitters share a single modulator while the receivers share a single demodulator. Such multiple-band operation is possible while sharing single transmitter and receiver intermediate frequency (IF) filters. Any required image rejection or channel selection filters can be fabricated within the same integrated circuit as the remaining transceiver circuitry. As a result, multiple modes of cellular telephone operation can be supported, such as AMPS, D-AMPS (digital AMPS), PCS, GSM, EDGE (enhanced data GSM environment), as well as features compatible with the Bluetooth standard.

A multiple-band wireless transceiver with quadrature conversion transmitter and receiver circuits in accordance with one embodiment of the present invention includes: outgoing data terminals; incoming data terminals; a quadrature signal source; transmitter signal generator circuitry; transmitter signal conversion circuitry; receiver signal generator circuitry; receiver signal conversion circuitry; quadrature modulation circuitry; up conversion circuitry; down conversion circuitry; and quadrature demodulation circuitry. The outgoing data terminals are for conveying a plurality of baseband outgoing data signals, while the incoming data terminals are for conveying a plurality of baseband incoming data signals. The quadrature signal source provides first and second pluralities of lower frequency quadrature signals.

The transmitter signal generator circuitry provides at least one local transmitter signal, while the transmitter signal conversion circuitry, coupled to the transmitter signal generator circuitry, receives and converts the at least one local transmitter signal to provide a plurality of transmitter conversion signals. The receiver signal generator circuitry provides at least one local receiver signal, while the receiver signal conversion circuitry, coupled to the receiver signal generator circuitry, receives and converts the at least one local receiver signal to provide a plurality of receiver conversion signals. The quadrature modulation circuitry, coupled to the quadrature signal source and the outgoing data terminals, receives and modulates the first plurality of lower frequency quadrature signals with the plurality of baseband outgoing data signals to provide a plurality of modulated outgoing data signals. The up conversion circuitry, coupled to the transmitter signal conversion circuitry and the quadrature modulation circuitry, receives and selectively up converts the plurality of modulated outgoing data signals with the plurality of transmitter conversion signals to provide a plurality of higher frequency outgoing data signals. The down conversion circuitry, coupled to the receiver signal conversion circuitry, receives and selectively down converts a plurality of higher frequency incoming data signals with the plurality of receiver conversion signals to provide a plurality of lower frequency incoming data signals. The quadrature demodulation circuitry, coupled to the down conversion circuitry and the incoming data terminals, receives and demodulates the plurality of lower frequency incoming data signals with the second plurality of lower frequency quadrature signals to provide the plurality of baseband incoming data signals.

A method for performing multiple-band wireless signal transmission and reception using quadrature signal conversion in accordance with another embodiment of the present invention includes the steps of:

generating first and second pluralities of lower frequency quadrature signals;

generating at least one local transmitter signal;

converting the at least one local transmitter signal and thereby generating a plurality of transmitter conversion signals;

generating at least one local receiver signal;

converting the at least one local receiver signal and thereby generating a plurality of receiver conversion signals;

quadrature modulating the first plurality of lower frequency quadrature signals with the plurality of baseband outgoing data signals and thereby generating a plurality of modulated outgoing data signals;

selectively up converting the plurality of modulated outgoing data signals with the plurality of transmitter conversion signals and thereby generating a plurality of higher frequency outgoing data signals;

selectively down converting a plurality of higher frequency incoming data signals with the plurality of receiver conversion signals and thereby generating a plurality of lower frequency incoming data signals; and quadrature demodulating the plurality of lower frequency incoming data signals with the second plurality of lower frequency quadrature signals and thereby generating the plurality of baseband incoming data signals.

DETAILED DESCRIPTION OF THE INVENTION

Figure 1:
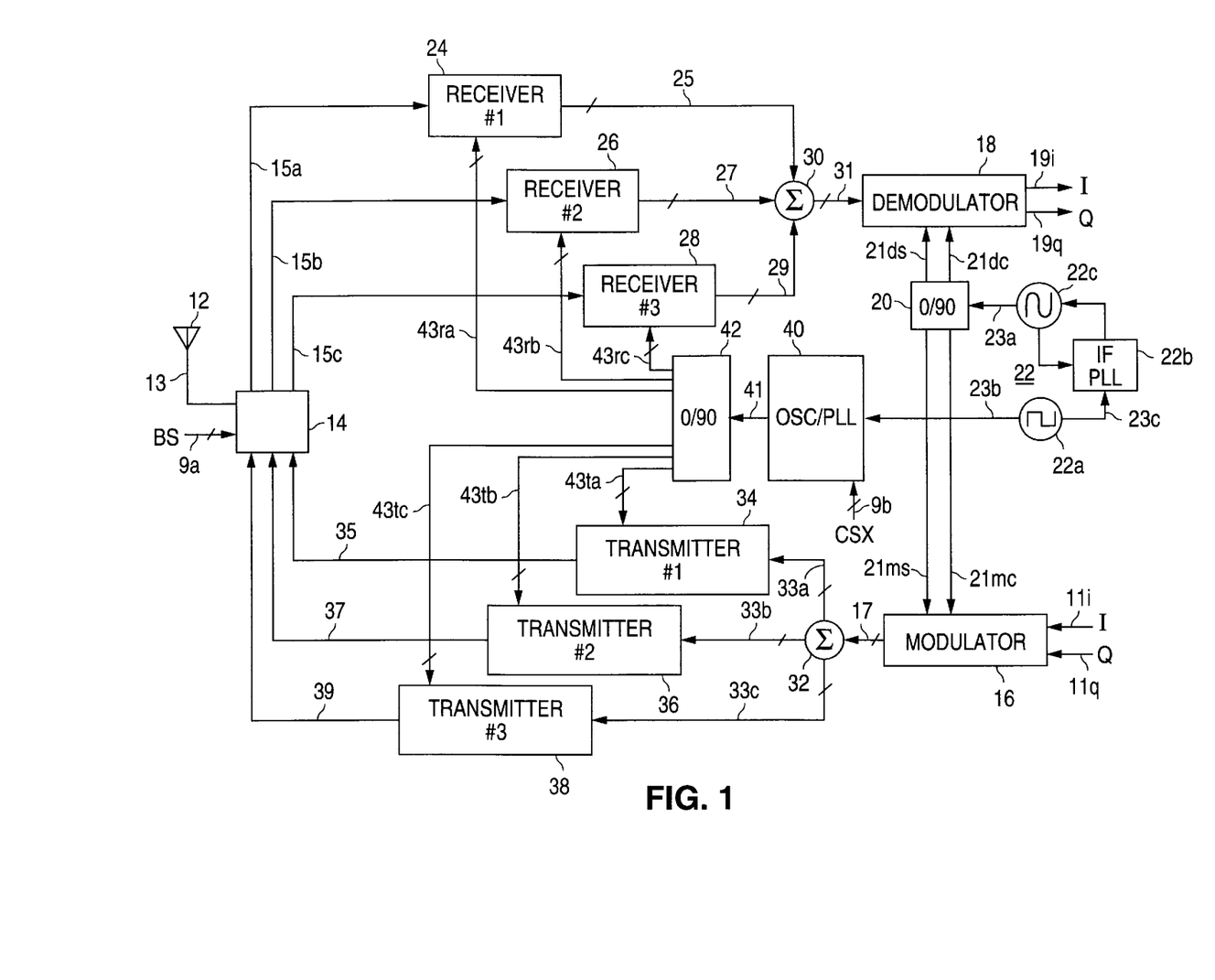
FIG. 1 is a functional block diagram of a multiple-band wireless transceiver system with quadrature conversion transmitter and receiver circuits in accordance with one embodiment of a related invention (which is the subject of another commonly assigned, copending patent application).

Referring to FIG. 1, a multiple-band wireless transceiver system 10a with quadrature conversion transmitter and receiver circuits in accordance with one embodiment of a related invention (which is the subject of another commonly assigned, copending patent application) includes multiple transmitter (up conversion) circuits 34, 36, 38, multiple receiver (down conversion) circuits 24, 26, 28, a single I-Q modulator 16, a single I-Q demodulator 18, a single local oscillator 40, and a single routing circuit 14, all interconnected substantially as shown. The common, or shared, local oscillator 40 provides for time division duplex operation with appropriate transmit and receive channels selected in accordance with a channel select control signal 9b, while a band select control signal 9a controls the routing of the various transmit 35, 37, 39 and receive 15a, 15b, 15c signals to and from the antenna 12, respectively.

A signal source 22 including a low frequency oscillator 22a (e.g., a 39 MHz crystal-based reference) provides two output signals 23b, 23c. Signal 23c serves as the reference for an intermediate frequency (IF) phase lock loop (PLL) 22b which controls an oscillator 22c for generating a frequency multiple 23a of the reference signal 23c. Signal 23a drives a phase splitter circuit 20 which provides quadrature oscillator signals 21ms, 21mc for the modulator 16, as well as quadrature oscillator signals 21ds, 21dc for the demodulator 18 (discussed in more detail below). Signal 23b drives the local oscillator circuit 40, which includes another oscillator and a PLL and provides the common local oscillator signal 41 used by the transmitter and receiver circuits (discussed in more detail below). This signal 41 drives a phase splitter circuit 42 which provides quadrature versions 43ta, 43tb, 43tc of the local oscillator signal 41 to the transmitter circuits 34, 36, 38, as well as quadrature versions 43ra, 43rb, 43rc to the receiver circuits 24, 26, 28 (discussed in more detail below). Due to operating speed requirements, it is preferred that the PLL within the local oscillator 40 be a fractional-N PLL.

Quadrature baseband digital data signals 11i, 11q are provided to the quadrature modulator 16 for quadrature modulation of the oscillator signals 21ms, 21mc. The resulting quadrature modulator signals 17 are distributed via a signal splitter 32 to the three transmitter circuits 34, 36, 38. Each of these transmitters 34, 36, 38 frequency up-converts its respective input signals 33a, 33b, 33c with its respective quadrature local oscillator signals 43ta, 43tb, 43tc. The resulting modulated and up-converted signals 35, 37, 39 are then switchably filtered and routed by the signal routing circuitry 14 (discussed in more detail below) to the antenna 12 via connection 13 for transmission, in accordance with the band select control signal 9a.

Signals received via the antenna 12 are fed by connection 13 to the signal routing circuit 14 for filtering and routing to the appropriate receiver circuit 24, 26, 28, in accordance with the band select control signal 9a. Each receiver circuit 24, 26, 28, frequency down-converts its respective input signal 15a, 15b, 15c with its respective quadrature local oscillator signals 43ra, 43b, 43rc (discussed in more detail below). The resulting down-converted receive signals 25, 27, 29 are routed, via a signal combiner 30, to the demodulator 18. The demodulator 18 quadrature demodulates its input signals 31 with its quadrature oscillator signals 21ds, 21dc to provide baseband quadrature data signals 19i, 19q.

Figure 2:
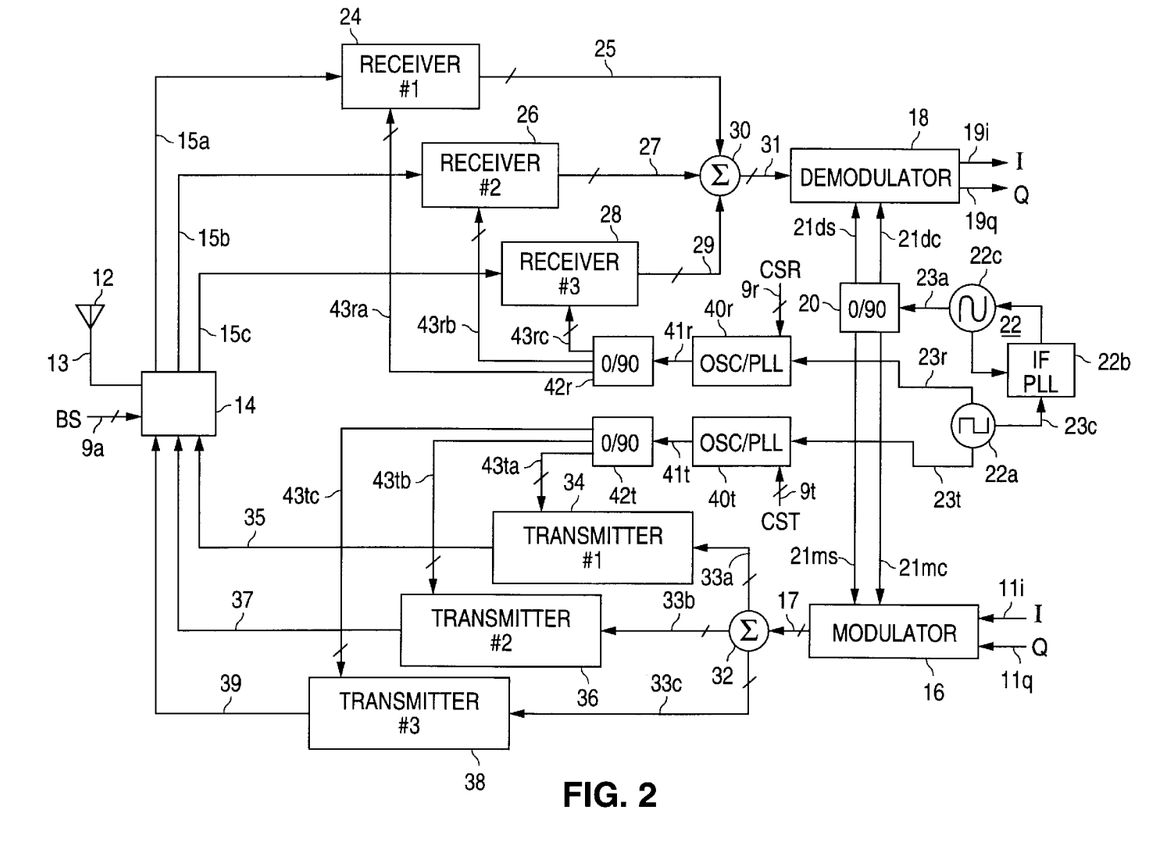
FIG. 2 is a functional block diagram of a multiple-band wireless transceiver system with quadrature conversion transmitter and receiver circuits in accordance with one embodiment of the present invention.

Referring to FIG. 2, another multiple-band wireless transceiver system 10b with quadrature conversion transmitter and receiver circuits in accordance with one embodiment of the present invention has many features similar to those of the circuit of FIG. 1, but provides for frequency division duplex operation by using dedicated local oscillators 40t, 40r for the transmitter and receiver stages. Low frequency oscillator 22a provides reference signals 23t, 23r to drive the dedicated local oscillators 40t, 40r. Each local oscillator 40t, 40r has its frequency selected in accordance with its respective channel select signal 9t, 9r. The resulting local oscillator signals 41t, 41r are then split into quadrature phases using phase splitter circuits 42t, 42r. The resulting quadrature local oscillator signals 43ta, 43tb, 43tc, 43ra, 43rb, 43rc are then distributed to the respective transmitter 34, 36, 38 and receiver 24, 26, 28 circuits. Due to operating speed requirements, it is preferred that the PLL within the receiver local oscillator 40r be a fractional-N PLL, whereas the PLL within the transmitter local oscillator 40t can be an integer PLL.

Figure 3:
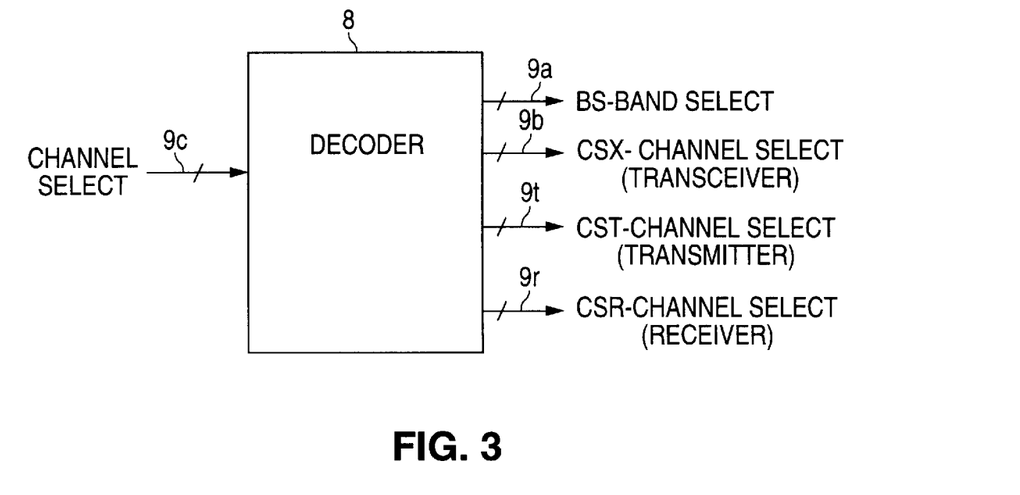
FIG. 3 is a functional block diagram illustrating the decoding operation to generate the band and channel select control signals from a master channel select signal.

Referring to FIG. 3, the various band select 9a and channel select 9b, 9t, 9r, signals can be decoded from a master channel select signal 9c using a decoder circuit 8 of conventional design.

Figure 4:
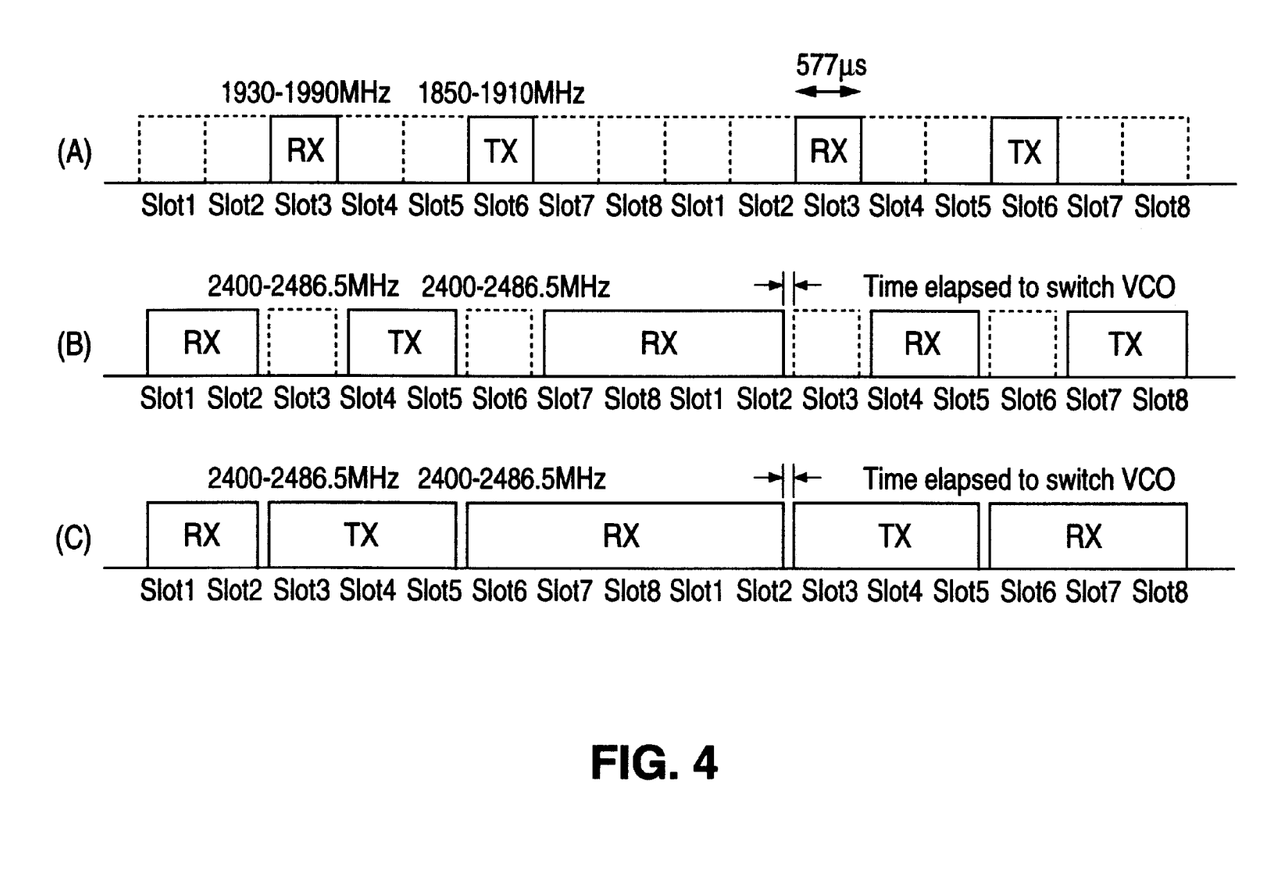
FIG. 4 is a timing diagram illustrating the time division duplex and frequency division duplex operation capabilities of the circuits of FIGS. 1 and 2, respectively.

Referring to FIG. 4 the time division duplex and frequency division duplex operation capabilities of the circuits of FIGS. 1 and 2 respectively, can perhaps be better understood. Waveform (A) illustrates, merely for purposes of example, the alternating transmit and receive time slots used in a PCS 1900 (GSM) cellular telephone system. Waveform (B) illustrates how the circuit of FIG. 1 can provide time division duplex operation using its common local oscillator 40. For example, following operation of the receive path in a PCS 1900 receive mode (time slot 3), subsequent unused time slots (4 and 5) can be used for operation of the transmit path in transmit mode within another frequency band such as Bluetooth. Conversely, following operation of the transmit path in a PCS 1900 transmit mode (time slot 6), subsequent unused time slots (7, 8, 1 and 2) can be used for operation of the receive path in receive mode within another frequency band such as Bluetooth. Waveform (C) illustrates how the circuit of FIG. 2 can provide frequency division duplex operation using its dedicated local oscillators 40t, 40r. As expected, simultaneous operations of the transmit and receive paths is possible, although during such simultaneous operations the transmit and receive frequency bands must be different.

Figure 5:
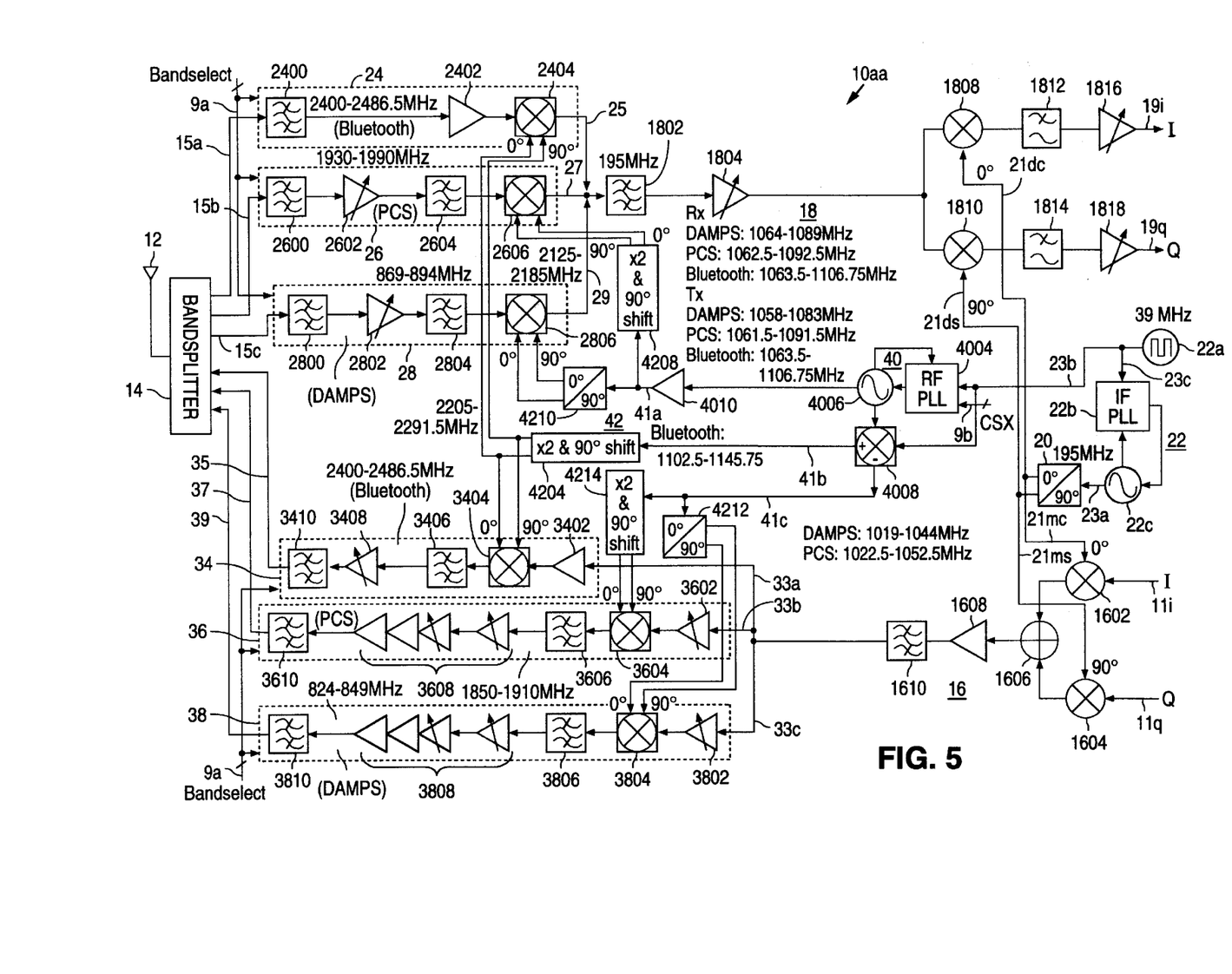
FIG. 5 is a more detailed functional block diagram of one example embodiment of the circuit of FIG. 1.

Referring to FIG. 5, a more detailed embodiment 10aa of the system 10a of FIG. 1 will be described in more detail. The local oscillator 40 uses its input signal 23b for driving a radio frequency (RF) PLL 4004 and a mixer 4008. The PLL 4004 controls an oscillator 4006 which also drives mixer 4008 and is buffered by a buffer amplifier 4010. The oscillator signal 41a drives another phase splitter 4210 and a frequency doubler and phase splitter 4208. The resulting quadrature signals from the phase splitter 4210 drive the frequency down-conversion circuit 2806 in receiver 28, while the frequency-doubled quadrature signals drive the frequency down-conversion circuit 2606 in receiver 26.

Mixer signal 41b is frequency-doubled and phase-split with a frequency doubler and phase splitter 4204, with the resulting signals being used to drive the frequency up-conversion 3404 and frequency down-conversion 2404 circuits in transmitter 34 and receiver 24, respectively. Mixer signal 41c is used to drive a frequency doubler and phase splitter 4214 and phase splitter 4212. The frequency-doubled quadrature signals drive the frequency up-conversion circuit 3604 in transmitter 36, while the quadrature signals from the phase splitter 4212 drive the frequency up-conversion circuit 3804 in transmitter 38.

The quadrature outgoing data signals 11i, 11q, are mixed with the quadrature oscillator signals 21mc, 21ms in mixers 1602, 1604 and combined in a signal combiner 1606 before being amplified by amplifier 1608 and filtered by bandpass filter 1610 to provide the respective modulator data signals 33a, 33b, 33c for the transmitter circuits 34, 36, 38.

In the first transmitter 34 (e.g., designed for operation compatible with the Bluetooth standard), the modulated data signal 33a is amplified by amplifier 3402, frequency up-converted in mixer 3404 with the quadrature signals from the local oscillator 40, filtered with bandpass filter 3406, amplified with gain-controlled amplifier 3408 and filtered with bandpass filter 3410. The resulting transmit signal 35 is then routed to the antenna 12 via a bandsplitter circuit 14 (many conventional forms of which are well known in the art).

In the second transmitter 36 (e.g., compatible with the PCS standard), the modulated data signals 33b are amplified by variable gain amplifier 3602, frequency up-converted in mixer 3604 using the frequency-doubled quadrature signals from the local oscillator 40, filtered by bandpass filter 3606, amplified by a gain-controlled amplifier stage 3608 and filtered by bandpass filter 3610. The resulting transmit signal 37 is routed to the antenna 12 via the bandsplitter 14.

In the third transmitter 38 (e.g., compatible with the DAMPS standard) the modulated data signals 33c are amplified with variable gain amplifier 3802, frequency up-converted in mixer 3804 using the quadrature signals from the local oscillator 40, filtered in bandpass filter 3806, amplified in gain-controlled amplifier stage 3808 and filtered in bandpass filter 3810. The resulting transmit signal 39 is routed to the antenna 12 via bandsplitter 14.

In the first receiver circuit 24 (e.g., compatible with the Bluetooth standard), the incoming receive signal 15a arrives from the antenna 12 via the bandsplitter 14. This signal 15a is filtered by bandpass filter 2400, amplified by low noise amplifier 2402 and frequency down-converted in mixer 2404 using the quadrature signals originating from the local oscillator 40.

In the second receiver 26 (e.g., compatible with the PCS standard), the incoming signal 15b arrives from the antenna 12 via the bandsplitter 14. This signal 15b is filtered by bandpass filter 2600, amplified by gain-controlled low noise amplifier 2602, filtered by bandpass filter 2604 and frequency down-converted in mixer 2606 using the quadrature signals originating from the local oscillator 40.

In the third receiver 28 (e.g., compatible with the D-AMPS standard), the incoming signal 15c arrives from the antenna 12 via the bandsplitter 14. This signal 15c is filtered by bandpass filter 2800, amplified by gain-controlled low noise amplifier 2802, filtered by bandpass filter 2804 and frequency down-converted in mixer 2806 using the quadrature signals originating from the local oscillator 40.

These incoming receive signals 25, 27, 29 are filtered in a bandpass filter 1802, amplified in a gain-controlled amplifier 1804 and provided to the mixers 1808, 1810 within the demodulator 18. These mixers 1808, 1810 use the quadrature oscillator signals 21dc, 21ds to quadrature demodulate the data signals, following which they are filtered in lowpass filters 1812, 1814 and amplified with gain-controlled amplifiers 1816, 1818 to produce the baseband quadrature data signals 19i, 19q.

In a preferred embodiment, most of this system 10aa is integrated in a single integrated circuit, with the exception of certain filter, switch and amplifier functions such as lowpass filters 1812 and 1814, intermediate frequency transmit filter 1610, and gain-controlled power amplifiers 3608 and 3808, and perhaps filters 2400, 2600, 2800, 3410, 3610 and 3810, and bandsplitter 14. Also, based upon the foregoing discussion, it will be appreciated that the circuitry of this system 10aa is minimized by the use of certain components of subsystems for multiple functions. For example, the oscillator 4006, PLL 4004 and amplifier 4010 are common to both the transmitter and receiver functions. Within the transmitter, the mixers 1602, 1604, signal combiner 1606 and amplifier 1608 within the modulator 16 are common for all three transmitters 34, 36, 38. Similarly, within the receiver, the receive intermediate frequency filter 1802, amplifier 1804, signal splitter 1806, mixers 1808, 1810, and baseband amplifiers 1816, 1818 are used in combination with all three receiver circuits 24, 26, 28.

Figure 5A:
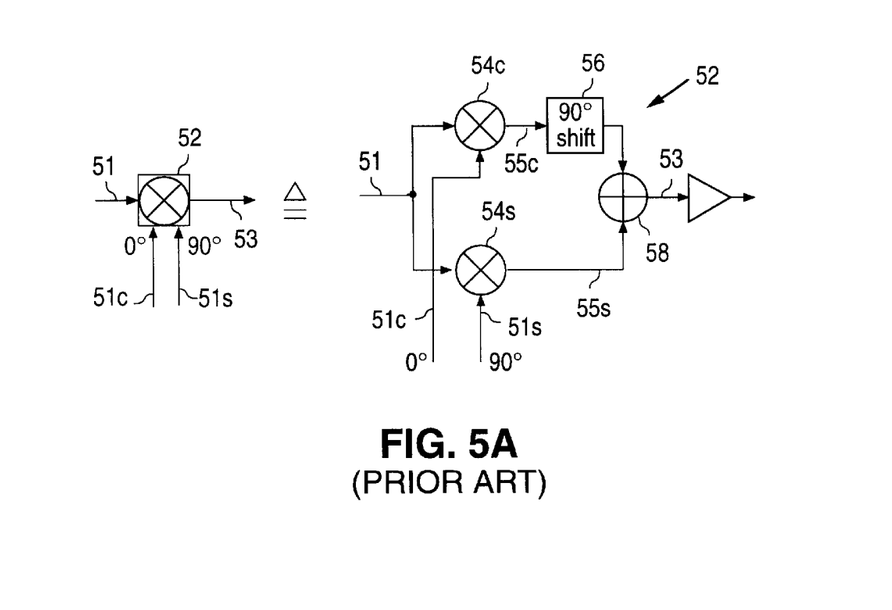
FIG. 5A is a functional block diagram of a conventional image reject mixer.

Referring to FIG. 5A, mixers 2404, 2606, 2806, 3404, 3606 and 3804 are represented symbolically as being image reject mixers, a conventional implementation of which is depicted here. Such a mixer design is well known in the art. The input signal is frequency converted in mixers 54*c*, 54*s* using quadrature local oscillator signals 54*c*, 54*s*. The resulting "in-phase" conversion signal 55*c* is phase shifted 90 degrees with a phase shifter 56 for summation with the "quadrature" conversion signal 55*s* in a signal combiner 58 to produce the output conversion signal 53. While implementations of the circuit of FIG. 5 (as well as FIG. 6, discussed below) can be realized using such image reject mixers, as discussed in more detail below in connection with FIGS. 7 and 8 more advantageous designs can be implemented.

Figure 6:
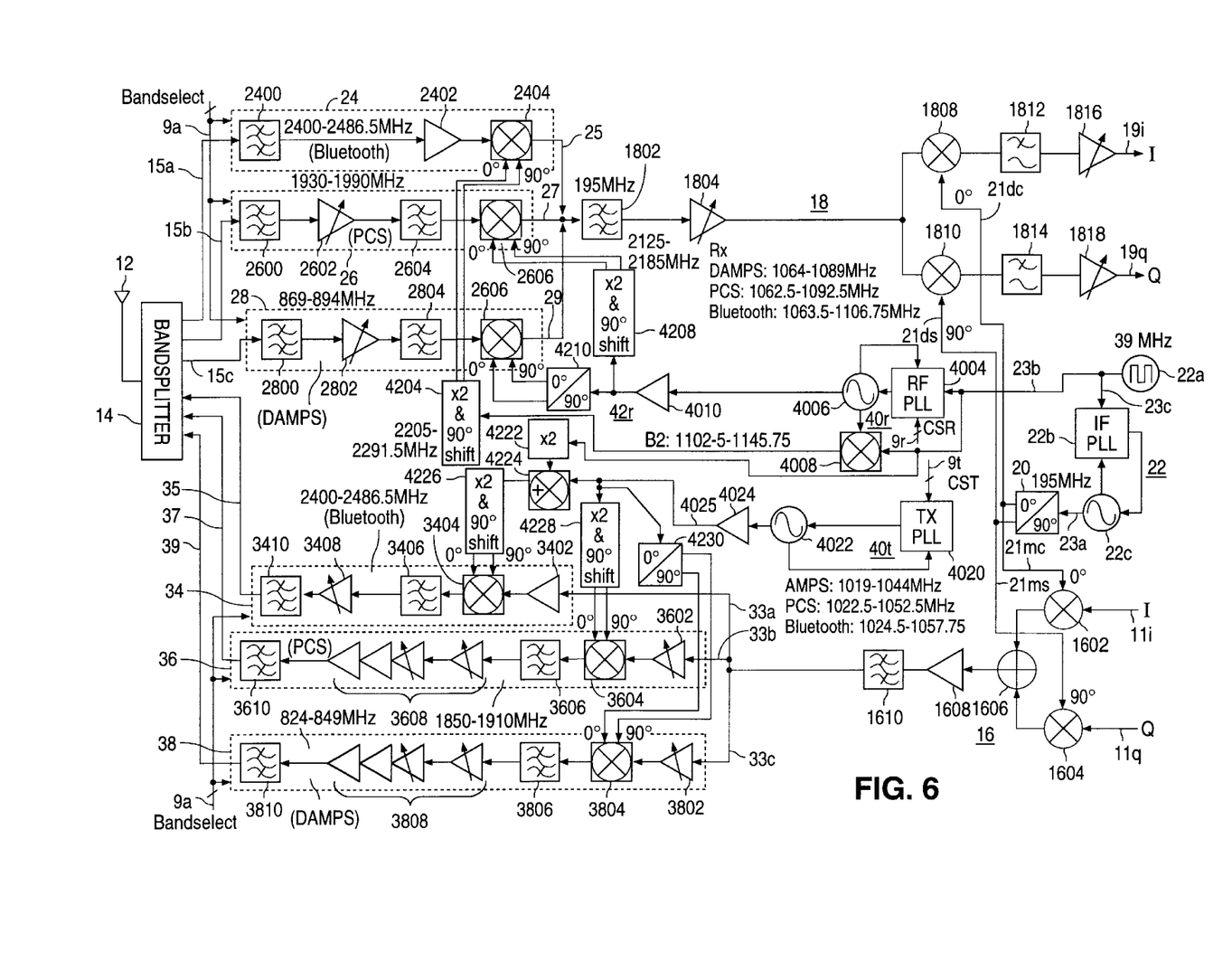
FIG. 6 is a more detailed functional block diagram of one example embodiment of the circuit of FIG. 2.

Referring to FIG. 6, a multiple-band wireless transceiver 10*ba* which allows for frequency division duplex operation has many similarities to the system 10*aa* of FIG. 5, with the exception of having separate local oscillators 40*t*, 40*r* for the transmitter and receiver sections. Otherwise, this system 10*ba* enjoys the same level of co-integration and sharing of system resources as noted above for the circuit of FIG. 5.

In this embodiment 10*ba*, the second signal 23*b* from the low frequency signal source 22 is used in the transmitter local oscillator 40*t* and the receiver local oscillator 40*r*.

In the transmitter local oscillator 40*t*, this signal 23*b* is doubled in frequency with a frequency doubler 4222. A transmitter PLL 4020 controls a local oscillator 4022 to generate a signal that is buffered by buffer amplifier 4024. The local oscillator signal 4025 is mixed in a mixer 4224 with the frequency doubled signal to produce another signal which is frequency doubled and phase split with frequency multiplier and phase splitter 4226 for use as the quadrature frequency up-conversion signals in mixer 3404 in the first transmitter 34. This signal 4025 is also frequency doubled and phase split by frequency multiplier and phase splitter 4228 for use as the quadrature frequency up-conversion signals in mixer 3604 in the second transmitter 36. This signal 4025 is further used to generate quadrature signals with a phase splitter 4230 for use as the frequency up-conversion signals in mixer 3804 in the third transmitter 38.

The receiver local oscillator 40*r* operates in substantially the same manner as the local oscillator circuit 40 described in connection with the system 10*aa* of FIG. 5.

Figure 7:
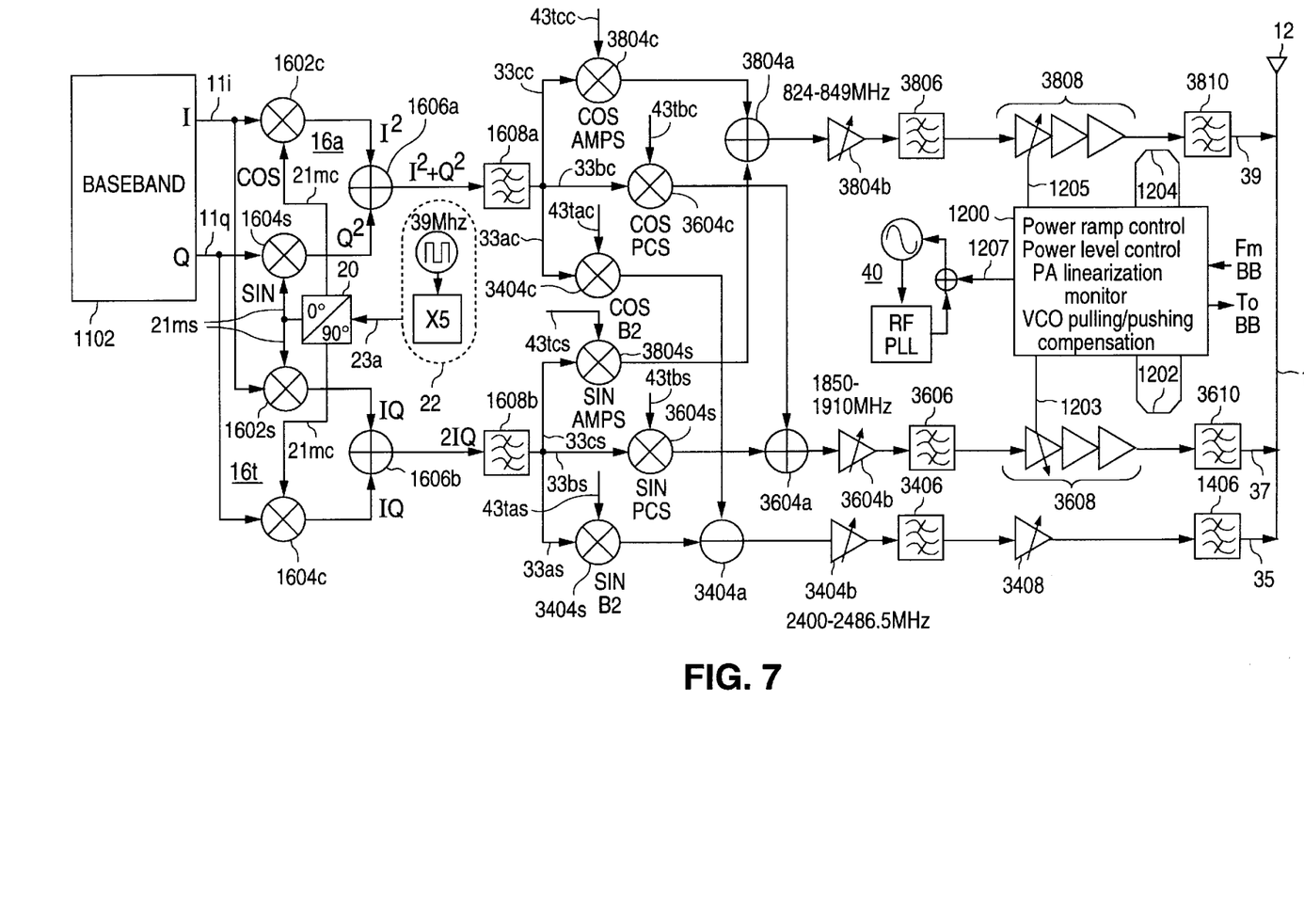
FIG. 7 is a functional block diagram of one example embodiment of the transmitter circuitry of the circuits of FIGS. 5 and 6.

Referring to FIG. 7, a preferred embodiment of the transmit path of the circuits of FIGS. 5 and 6 is implemented as shown. The baseband quadrature data signals 11*i*, 11*q* are applied to a dual modulator arrangement 16*a*, 16*b* in which the in-phase data signal 11*i* modulates both the in-phase 21*mc* and quadrature-phase 21*ms* versions of the signal from the oscillator 2202 in mixers 1602*c* and 1602*s*, respectively. Similarly, the quadrature-phase baseband data signal 11*q* modulates both the in-phase 21*mc* and quadrature-phase 21*ms* versions of the oscillator signal in mixers 1604*c* and 1604*s*, respectively. The resulting signals are combined in signal combiners 1606*a* and 1606*b* and filtered in bandpass filters 1608*a* and 1608*b*. The filtered signals are used to produce three pairs of signals 33*ac* and 33*as*, 33*bc* and 33*bs*, and 33*cc* and 33*cs* for frequency up-conversion in the transmitters 34, 36, 38.

In the first transmitter 34, modulated data signals 33*ac* and 33*as* are frequency up-converted in mixers 3404*c* and 3404*s* using frequency up-conversion signals 43*tac* and 43*tas*, respectively. The resulting frequency up-converted signals are differentially combined (i.e., subtracted) in signal combiner 3404*a*, amplified with gain-controlled amplifier 3404*b*, filtered with bandpass filter 3406, amplified with gain-controlled amplifier 3408 and filtered with bandpass filter 3410.

In the second transmitter 36, modulated data signals 33*bc* and 33*bs* are frequency up-converted in mixers 3604*c* and 3604*s* using frequency up-conversion signals 43*tbc* and 43*tbs*, respectively. The resulting frequency up-converted signals are added in signal combiner 3604*a*, amplified with gain-controlled amplifier 3604*b*, filtered with bandpass filter 3606, amplified with gain-controlled amplifier stage 3608 and filtered with bandpass filter 3610.

In the third transmitter path 38, modulated data signals 33*cc* and 33*cs* are frequency up-converted in mixers 3804*c* and 3804*s* using frequency up-conversion signals 43*tcc* and 43*tcs*, respectively. The resulting frequency up-converted signals are added in signal combiner 3804*a*, amplified with gain-controlled amplifier 3804*b*, filtered with bandpass filter 3806, amplified with gain-controlled amplifier stage 3808 and filtered with bandpass filter 3810.

A control stage 1200 is used to sense the power levels of the outgoing PCS and DAMPS signals in a conventional manner using power sensors 1202, 1204 for purposes of providing the control signals 1203, 1205 to the variable gain amplifier stages 3608, 3808. This control stage 1200 also produces a control signal 1207 for compensating any pulling or pushing of the output frequency of the voltage controlled oscillator (VCO) within the local oscillator stage 40.

Figure 8:
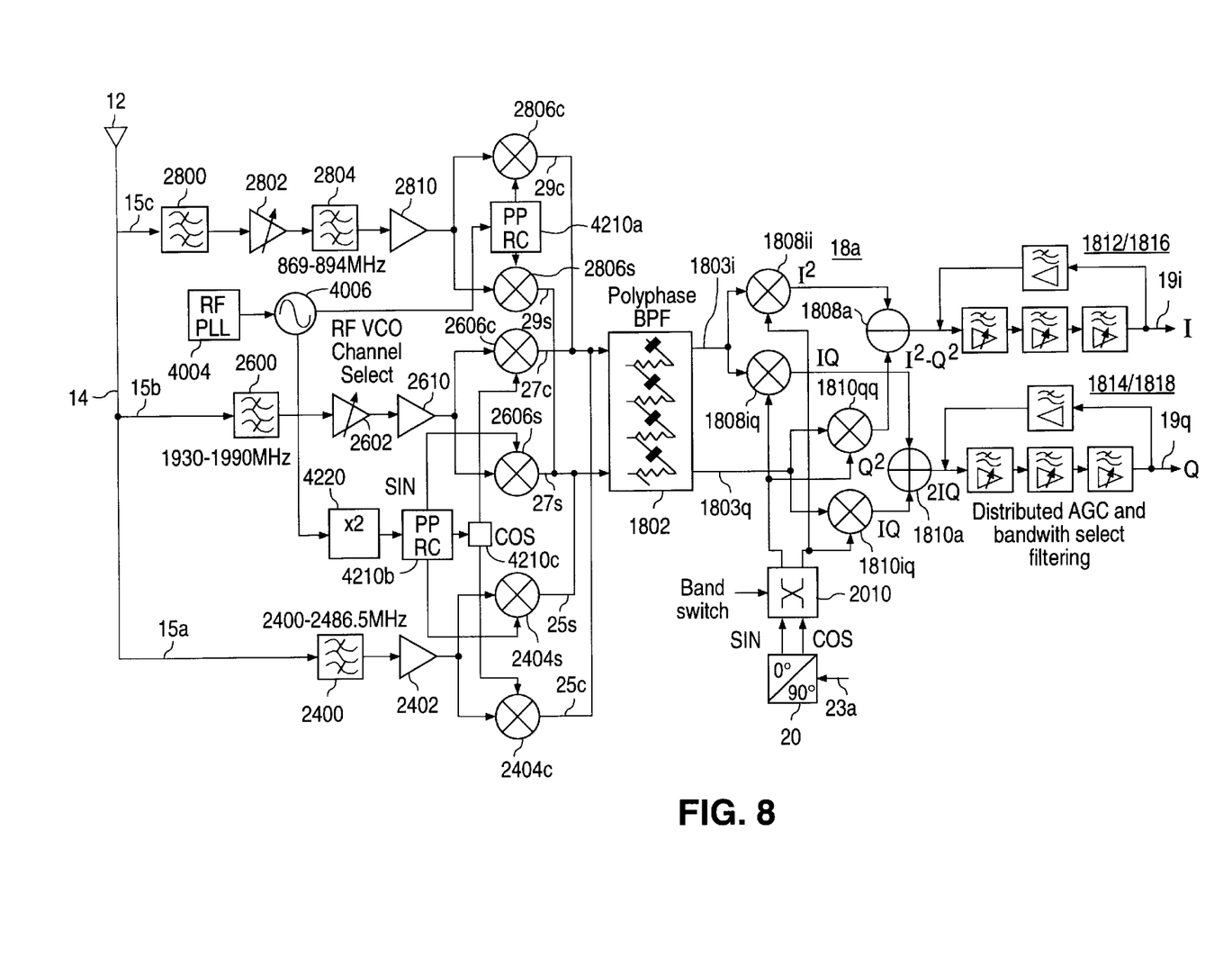
FIG. 8 is a functional block diagram of one example embodiment of the receiver circuitry of the circuits of FIGS. 5 and 6.

Referring to FIG. 8, a preferred embodiment of the receiver signal paths for the systems 10*aa*, 10*ba* of FIGS. 5 and 6 can be implemented as shown. The three incoming receive signals 15*a*, 15*b*, 15*c* arrive at the inputs to the receivers 24, 26, 28 via the bandsplitter 14 as discussed above in connection with the systems of FIGS. 5 and 6.

In the first receiver 24, the incoming signal 15*a* is filtered with bandpass filter 2400 and amplified with amplifier 2402 to provide two signals for quadrature frequency down-conversion in mixers 2404*c* and 2404*s* using frequency-multiplied and quadrature-phase versions of the local oscillator signal generated by VCO 4006.

In the second receiver 26, the incoming signal 15*b* is filtered by bandpass filter 2600 and amplified by amplifiers 2602 and 2610, and frequency down-converted in mixers 2606*c* and 2606*s* using the aforementioned quadrature local oscillator signal phases.

In the third receiver 28, the incoming signal 15*c* is filtered with bandpass filter 2800, amplified with amplifier 2802, filtered with bandpass filter 2804 and amplified with amplifier 2810 for frequency down-conversion in mixers 2806*c* and 2806*s* using quadrature signal phases of the local oscillator signal generated by VCO 4006.

Polyphase resistor-capacitor filters (PPRC) 4210*a*, 4210*b* (various forms of which are conventional and well known in the art) are used to generate the quadrature signal phases of the local oscillator signal originated in VCO 4006.

The resulting in-phase, frequency down-converted data signals 25*c*, 27*c*, 29*c* and their counterpart quadrature, frequency down-converted data signals 25*s*, 27*s*, 29*s* are filtered in a PPRC bandpass filter stage 1802. The resulting bandpass filtered signals 1803*i*, 1803*q* are applied to mixers 1808*ii*, 1808*iq*, 1810*qq*, 1810*iq* for quadrature demodulation using the quadrature signal phases of the signal 23*a* originating from signal source 22 (FIGS. 5 and 6).

The resulting demodulated signals from mixers 1808*ii* and 1810*qq* are differentially combined (subtracted) in signal combiner 1808a to produce the in-phase baseband data signal which is amplified and lowpass filtered in amplifier and filter stage 1812/1816 to produce baseband data signal 19i.

Similarly, the demodulated data signals produced by mixers 1808iq and 1810iq are summed in signal combiner 1810a to produce the quadrature baseband data signal which is amplified and filtered in amplifier and filter stage 1814/1818 to produce baseband data signal 19q.

Based upon the foregoing discussion, and as noted earlier, it can be seen that when using the transceiver systems of FIGS. 5 and 6, particularly if implemented using the transmitter and receiver architectures of FIGS. 7 and 8, respectively, a number of advantages can be realized. With respect to the transmitter architecture of FIG. 7, it can be seen that the intermediate frequency filter normally needed for a transmitter has been eliminated in favor of bandpass filters 1608a and 1608b (FIG. 7) that can be implemented in the form of conventional PPRC filters. Additionally, the 90-degree phase shifters normally used in conventional image rejection mixers are unnecessary due to the use of quadrature signals in the frequency up-conversion process. This is also advantageously eliminates feed through of the carrier signals used in the direct frequency up-conversion process.

With respect to the receiver architecture of FIG. 8, one advantage is also elimination of an intermediate frequency filter requirement due to the direct conversion to baseband within the demodulator 18a (FIG. 8). Additionally, image rejection filters are unnecessary due to the signal mixing using quadrature signals as described.

Additionally, further based upon the foregoing discussion, a number of advantages are realized using a transceiver in accordance with the present invention. First, the necessary operating frequencies for multiple distinct operating frequency bands can be generated by a single synthesizer using a single reference oscillator. Moreover, this can be accomplished using a frequency plan in which only a narrow tuning range for the voltage controlled oscillator (VCO) is necessary. This advantageously allows for a reduction in the required sensitivity of the VCO, thereby improving its noise performance, reducing its frequency switching time and reducing its cost. Second, a common intermediate frequency (IF) stage can be used for the receiver circuits rather than replicating an IF stage for each operating frequency band. Third, while one frequency band is active in a receive mode of operation, the transmitter can be operating in another frequency band, multiplexed in the time domain such that, to the user, the system appears to operate in a full duplex communication mode. (For example, when operating with GSM and Bluetooth modes interleaved in time, continuous operation can be achieved.) Fourth, when dedicated transmit and receive frequency synthesizers are used (with the single reference oscillator), multiplexing in the frequency domain can be achieved, thereby enhancing the apparent full duplex operation.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a multiple-band wireless transceiver with quadrature conversion transmitter and receiver circuits, comprising:
   a plurality of outgoing data terminals for conveying a plurality of baseband outgoing data signals;
   a plurality of incoming data terminals for conveying a plurality of baseband incoming data signals;
   a quadrature signal source that provides first and second pluralities of lower frequency quadrature signals;
   transmitter signal generator circuitry that provides at least one local transmitter signal;
   transmitter signal conversion circuitry, coupled to said transmitter signal generator circuitry, that receives and converts said at least one local transmitter signal to provide a plurality of transmitter conversion signals;
   receiver signal generator circuitry that provides at least one local receiver signal;
   receiver signal conversion circuitry, coupled to said receiver signal generator circuitry, that receives and converts said at least one local receiver signal to provide a plurality of receiver conversion signals;
   quadrature modulation circuitry, coupled to said quadrature signal source and said plurality of outgoing data terminals, that receives and modulates said first plurality of lower frequency quadrature signals with said plurality of baseband outgoing data signals to provide a plurality of modulated outgoing data signals;
   up conversion circuitry, coupled to said transmitter signal conversion circuitry and said quadrature modulation circuitry, that receives and selectively up converts said plurality of modulated outgoing data signals with said plurality of transmitter conversion signals to provide a plurality of higher frequency outgoing data signals;
   down conversion circuitry, coupled to said receiver signal conversion circuitry, that receives and selectively down converts a plurality of higher frequency incoming data signals with said plurality of receiver conversion signals to provide a plurality of lower frequency incoming data signals; and
   quadrature demodulation circuitry, coupled to said down conversion circuitry and said plurality of incoming data terminals, that receives and demodulates said plurality of lower frequency incoming data signals with said second plurality of lower frequency quadrature signals to provide said plurality of baseband incoming data signals.

2. The apparatus of claim 1, wherein said quadrature signal source comprises phase splitting circuitry that receives and phase-splits a source signal to provide said first and second pluralities of lower frequency quadrature signals.

3. The apparatus of claim 2, wherein said quadrature signal source further comprises an oscillator circuit, coupled to said phase splitting circuitry, that provides said source signal.

4. The apparatus of claim 3, wherein:
   said transmitter signal generator circuitry comprises first phase lock loop circuitry, coupled to said oscillator circuit, that uses said source signal as a first reference signal to generate said at least one local transmitter signal; and
   said receiver signal generator circuitry comprises second phase lock loop circuitry, coupled to said oscillator circuit, that uses said source signal as a second reference signal to generate said at least one local receiver signal.

5. The apparatus of claim 1, wherein:
said transmitter signal generator circuitry comprises first phase lock loop circuitry; and
said receiver signal generator circuitry comprises second phase lock loop circuitry.

6. The apparatus of claim 1, wherein:
said transmitter signal conversion circuitry comprises first phase splitting circuitry that receives and phase-splits said at least one local transmitter signal to provide a first plurality of pairs of higher frequency quadrature signals as said plurality of transmitter conversion signals; and
said receiver signal conversion circuitry comprises second phase splitting circuitry that receives and phase-splits said at least one local receiver signal to provide a second plurality of pairs of higher frequency quadrature signals as said plurality of receiver conversion signals.

7. The apparatus of claim 6, wherein said up conversion circuitry comprises:
filter circuitry that filters said plurality of modulated outgoing data signals to provide a plurality of filtered modulated outgoing data signals; and
signal mixing circuitry, coupled to said filter circuitry, that selectively up converts said plurality of filtered modulated outgoing data signals with said plurality of transmitter conversion signals to provide said plurality of higher frequency outgoing data signals.

8. The apparatus of claim 6, wherein said down conversion circuitry comprises:
signal mixing circuitry that selectively down converts said plurality of higher frequency incoming data signals with said plurality of receiver conversion signals to provide said plurality of lower frequency incoming data signals; and
filter circuitry, coupled to said signal mixing circuitry, that filters said plurality of lower frequency incoming data signals.

9. The apparatus of claim 1, wherein said quadrature modulation circuitry comprises:
first signal mixing circuitry that modulates one of said first plurality of lower frequency quadrature signals with one of said plurality of baseband outgoing data signals to provide one of said plurality of modulated outgoing data signals; and
second signal mixing circuitry that modulates another of said first plurality of lower frequency quadrature signals with another of said plurality of baseband outgoing data signals to provide another of said plurality of modulated outgoing data signals.

10. The apparatus of claim 1, wherein said up conversion circuitry comprises:
filter circuitry that filters said plurality of modulated outgoing data signals to provide a plurality of filtered modulated outgoing data signals; and
signal mixing circuitry, coupled to said filter circuitry, that selectively up converts said plurality of filtered modulated outgoing data signals with said plurality of transmitter conversion signals to provide said plurality of higher frequency outgoing data signals.

11. The apparatus of claim 1, wherein said down conversion circuitry comprises:
signal mixing circuitry that selectively down converts said plurality of higher frequency incoming data signals with said plurality of receiver conversion signals to provide said plurality of lower frequency incoming data signals; and
filter circuitry, coupled to said signal mixing circuitry, that filters said plurality of lower frequency incoming data signals.

12. The apparatus of claim 1, wherein said quadrature demodulation circuitry comprises:
first signal mixing circuitry that demodulates one of said plurality of lower frequency incoming data signals with one of said second plurality of lower frequency quadrature signals to provide one of said plurality of baseband incoming data signals; and
second signal mixing circuitry that demodulates one of said plurality of lower frequency incoming data signals with another of said second plurality of lower frequency quadrature signals to provide another of said plurality of baseband incoming data signals.

13. The apparatus of claim 1, further comprising signal routing circuitry, coupled to said up conversion circuitry and said down conversion circuitry, that selectively conveys said plurality of higher frequency outgoing data signals and said plurality of higher frequency incoming data signals.

14. An apparatus including a multiple-band wireless transceiver with quadrature conversion transmitter and receiver circuits, comprising:
outgoing data means for conveying a plurality of baseband outgoing data signals;
incoming data means for conveying a plurality of baseband incoming data signals;
quadrature signal source means for providing first and second pluralities of lower frequency quadrature signals;
transmitter signal generator means for providing at least one local transmitter signal;
transmitter signal conversion means for receiving and converting said at least one local transmitter signal and providing a plurality of transmitter conversion signals;
receiver signal generator means for providing at least one local receiver signal;
receiver signal conversion means for receiving and converting said at least one local receiver signal and providing a plurality of receiver conversion signals;
quadrature modulation means for receiving and modulating said first plurality of lower frequency quadrature signals with said plurality of baseband outgoing data signals and thereby providing a plurality of modulated outgoing data signals;
up conversion means for receiving and selectively up converting said plurality of modulated outgoing data signals with said plurality of transmitter conversion signals and thereby providing a plurality of higher frequency outgoing data signals;
down conversion means for receiving and selectively down converting a plurality of higher frequency incoming data signals with said plurality of receiver conversion signals and thereby providing a plurality of lower frequency incoming data signals; and
quadrature demodulation means for receiving and demodulating said plurality of lower frequency incoming data signals with said second plurality of lower frequency quadrature signals and thereby providing said plurality of baseband incoming data signals.

15. A method for performing multiple-band wireless signal transmission and reception using quadrature signal conversion, comprising:
generating first and second pluralities of lower frequency quadrature signals;

generating at least one local transmitter signal;

converting said at least one local transmitter signal and thereby generating a plurality of transmitter conversion signals;

generating at least one local receiver signal;

converting said at least one local receiver signal and thereby generating a plurality of receiver conversion signals;

quadrature modulating said first plurality of lower frequency quadrature signals with said plurality of baseband outgoing data signals and thereby generating a plurality of modulated outgoing data signals;

selectively up converting said plurality of modulated outgoing data signals with said plurality of transmitter conversion signals and thereby generating a plurality of higher frequency outgoing data signals;

selectively down converting a plurality of higher frequency incoming data signals with said plurality of receiver conversion signals and thereby generating a plurality of lower frequency incoming data signals; and quadrature demodulating said plurality of lower frequency incoming data signals with said second plurality of lower frequency quadrature signals and thereby generating said plurality of baseband incoming data signals.

* * * * *